May 11, 1954     K. D. SMITH     2,678,427
LINEARITY MEASURING SCHEME
Filed June 27, 1950
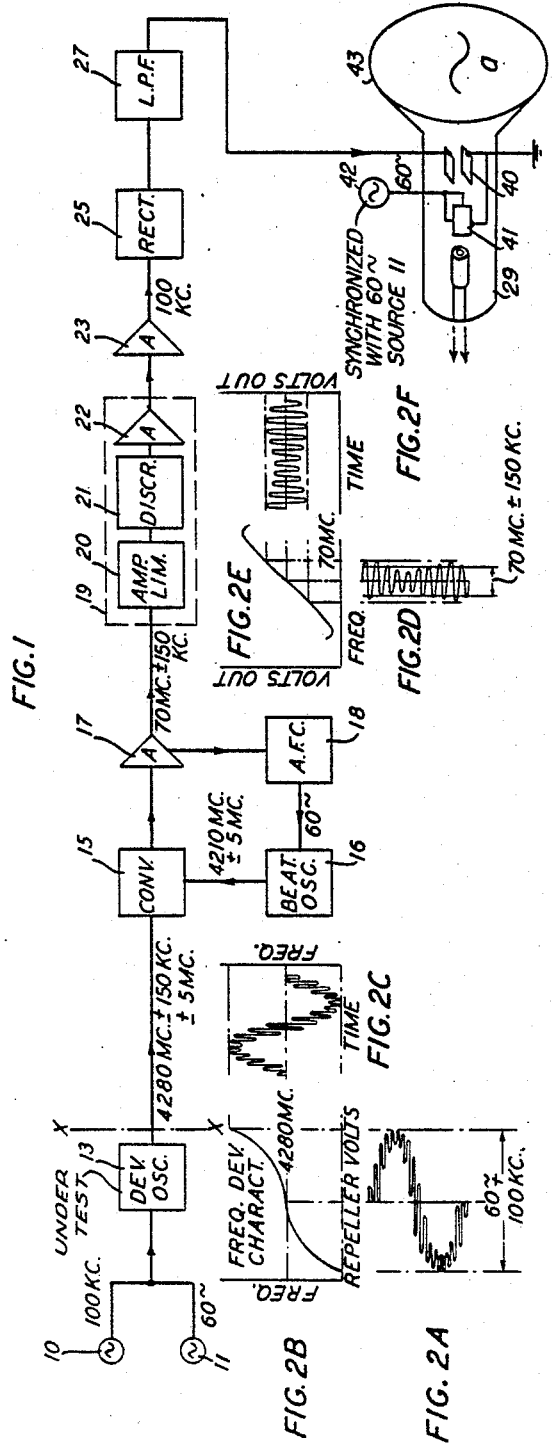
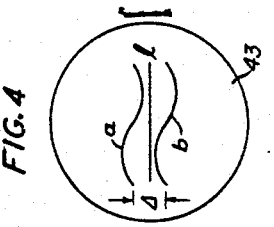
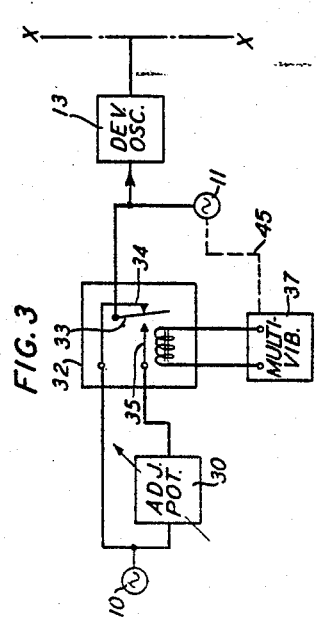
INVENTOR
*K. D. SMITH*
BY
*H. A. Burgess*
ATTORNEY Patented May 11, 1954

2,678,427

UNITED STATES PATENT OFFICE 2,678,427

LINEARITY MEASURING SCHEME

Kenneth D. Smith, Westfield, N. J., assignor to Bell Telephone Laboratories, Incorporated, New York, N. Y., a corporation of New York Application June 27, 1950, Serial No. 170,605

13 Claims. (Cl. 332—20)

This invention relates to a method of and apparatus for measuring the non-linearity of an electrical system or device the response of which is a non-linear function of some parameter of an applied input signal, and more particularly to an improved method of an apparatus for ascertaining the non-linearity of the frequency response characteristic of frequency responsive devices such as frequency-modulation transmitters and the like.

Most electrical circuits composed of lumped circuit elements exhibit linear response characteristics. There are however, a number of electrical devices and circuit combinations thereof whose response characteristics are a non-linear function of some parameter of an applied input signal. Common forms of non-linear amplitude response characteristics are the direct-current voltage versus current relationship of a thyrite resistance element and the frequency versus output voltage relationship of frequency-sensitive circuits such as frequency modulation discriminators. The frequency-deviation characteristic representing the modulating voltage versus frequency-deviation relationship of reactance tube or velocity variation type oscillators illustrates a form of non-linear frequency-response characteristic with which this invention is concerned.

A measure of the non-linearity of an electrical system or device is the maximum departure from constant slope of the characteristic curve representing the response of the system or device to some parameter of an applied input signal over its normal operating range of input parameter values.

In high frequency communications and television transmission systems wherein several frequency channels are transmitted simultaneously, the presence of non-linearity in the circuit components thereof introduces undesirable intermodulation and cross-talk effects which tend to seriously impair the fidelity of the transmitted intelligence. Corrective means may be employed in some cases in order to compensate for the non-linearity of the circuit elements, and in these instances it is usually of importance to know the degree of non-linearity of the circuit element or elements to be corrected.

It has been a general practice heretofore to measure the non-linearity of an electrical device by plotting its response to some parameter of an applied input signal and computing therefrom the departure from constant slope over its normal operating range. This technique, however, is unsatisfactory in that it is indirect and tedious and is not readily suited for measurements where the non-linearity is slight. In addition it is subject to error in that it includes in the final results the non-linearity of the various components of the test apparatus.

Accordingly it is a general object of the present invention to provide a method of and apparatus for directly and accurately measuring the non-linearity of the frequency-response characteristic of frequency responsive electrical devices.

A specific object of the present invention is to provide a method of and apparatus for directly and accurately measuring the non-linearity of the modulating voltage versus frequency-deviation characteristic of a frequency-modulation transmitter whereby the non-linearity of the components of the measuring apparatus are not included in the final results.

In accordance with the invention the non-linearity of the modulating voltage versus frequency-deviation relationship, hereinafter called the frequency-deviation characteristic, of a frequency-modulation transmitter is measured by frequency modulating the transmitter over a narrow range of its operating frequency values with a first component of modulating voltage that varies at a first cyclical rate of repetition and additionally frequency modulating the transmitter substantially over its entire normal operating frequency range with a second component of modulating voltage that varies at a second cyclical rate of repetition lower than said first rate. The width of the narrow frequency range over which the transmitter is varied by the first component of modulating voltage will be affected by any non-linearity in the slope of the frequency-deviation characteristic as the frequency position of this band is swept, in effect, continually back and forth across the entire operating frequency range of the transmitter by the second component of modulating voltage.

The frequency-modulation component of the transmitter output effected by the second component of modulating voltage is removed by heterodyning the transmitter output with beating oscillations whose mean frequency, as will be explained hereinafter, is controlled to follow automatically those frequency variations of the transmitter output effected by the second component of modulating voltage and differs from said frequency variations by a constant preselected amount.

The signal resulting from said heterodyning is then applied to the input of a frequency-modulation receiver where the first component of modulating voltage is recovered and rectified to obtain its modulation envelope which is displayed on the screen of an oscilloscope as a measure of the transmitter non-linearity.

The invention is also adapted to provide a parallel trace linearity scale on the screen of the oscilloscope to enable a direct and convenient means for determining the non-linearity of the transmitter as will be explained hereinafter.

The nature of the present invention and other objects, features and advantages thereof will be apparent from a consideration of the following detailed description and the appended drawings illustrating the invention.

Fig. 1 is a block diagrammatic showing of the components of the apparatus used for measuring the non-linearity of the frequency-deviation characteristic of a frequency-modulation transmitter;

Figs. 2A to 2F, inclusive, are curves that are useful in explaining the theory and operation of the measuring apparatus of Fig. 1;

Fig. 3 is a block schematic showing of additional apparatus that may be used in Fig. 1 to provide a double trace linearity scale on the screen of the oscilloscope; and Fig. 4 illustrates the double trace on the oscilloscope provided by the apparatus of Figs. 1 and 3.

Fig. 1 illustrates the apparatus used in accordance with the invention for measuring the non-linearity of the frequency-deviation characteristic of a frequency-modulation transmitter. The apparatus comprises a first modulation or test signal source 10 and a second modulating or sweep-signal source 11, each connected to the input of a deviation oscillator 13 which constitutes a frequency-modulation transmitter under test for the purpose of this explanation. The output of deviation oscillator 13 is combined in a converter 15 with that from a source 16 of beating oscillations controlled by an A. F. C. circuit 18 whose input is shown connected to the output of converter 15 through an I. F. limiter-amplifier 17. The remainder of the apparatus connected to the output of limiter-amplifier 17 comprises a tandem combination of a frequency-modulation receiver 19 which includes an amplitude-limiter stage 20, a frequency discriminator 21 and a video frequency amplifier 22, a narrow band-pass amplifier 23, a rectifier 25, a low-pass filter 27 and a cathode-ray oscilloscope 29.

Where the transmitter under test, for example, includes, in addition to the deviation oscillator 13, circuit components corresponding to the aforementioned circuit elements 15, 16, 17 and 18 above, such transmitter components can be employed for the corresponding circuit components of the measuring equipment shown in Fig. 1.

For the purpose of setting forth a complete measuring system, it will be assumed that the deviation oscillator 13 has a normal operating frequency range of 4275 to 4285 mc. centered about a mean frequency of 4280 mc. and that the input frequency range of the frequency-modulation receiver 19 is centered at 70 mc. The mean frequency setting of beating oscillator 16 under these conditions may be 4210 mc., and the transmission band of the I. F. limiter amplifier 17 centered at 70 mc. so that the I. F. output of converter 15 will lie within the input frequency range of frequency-modulation receiver 19.

Appropriate frequency values for the high frequency test signal and the low frequency sweep signal supplied by the sources 10 and 11 may be 100 kc., and 60 cycles, respectively; and the factors controlling the solution of these signal frequencies are as follows:

1. The test signal and sweep signal should be separated in frequency sufficiently to simplify their separation at the receiver output;

2. A convenient value for the low frequency sweep signal is 60 cycles since it is readily available from commercial power sources; and 3. The test signal frequency preferably should be such that the frequency-modulation sidebands it produces by frequency modulating the transmitter over the narrow frequency range mentioned hereinabove will not be spaced widely apart to obscure any fine variation in the frequency-deviation characteristic. For a frequency deviation of ±150 kc., for example, a 100-kc. test signal will ensure a faithful reproduction of the non-linearity of the frequency deviation characteristic of the transmitter under test.

The pass band of amplifier 23 is centered at 100 kc. to accept for amplification only the 100-kilocycle test signal component while low-pass filter 27 passes only the 60-cycle modulation envelope of the 10-kilocycle test signal received from the output of rectifier 25.

Structurally, the above components of the measuring apparatus are conventional and well known in the art. Briefly, test signal source 10 may be a 100-kc. stabilized oscillator, sweep signal source 11 a 60-cycle local power outlet, and converter 25 a microwave crystal converter. Deviation oscillator 13 and beating oscillator 16 may be velocity variation klystrons. Suitable forms for the I. F. limiter amplifier 17, A. F. C. circuit 18 and components 20, 21, and 22 of receiver 19 are described at pages 468 and 469 and illustrated at Figs. 10 and 12 of the article by J. F. Wentz and K. D. Smith entitled "A new microwave television system" appearing in the Transactions of the A. I. E. E., 1947, vol. 66. Amplifier 23 is a conventional 100-kc. narrow band-pass type, rectifier 25 a germanium crystal detector, filter 27 a low-pass filter that discriminates against high frequencies above 15 kc., for example, and cathode-ray oscilloscope 29 a conventional low frequency oscilloscope provided with internal synchronization.

The manner of operation of the non-linearity measuring equipment illustrated in Fig. 1 is as follows: A composite test signal, of the form illustrated at Fig. 2A and composed of a high frequency 100-kc. test signal from source 10 and a low frequency 60-cycle sweep signal from source 11, is applied to the repeller electrode of the deviation oscillator 13, the frequency-deviation characteristic of which is shown at Fig. 2B. The amplitude of the 100-kc. test signal component is adjusted to produce a narrow frequency deviation of, say, ±150 kc. about the center frequency of deviation oscillator 13 while the amplitude of the 60-cycle sweep-signal component is adjusted to produce a relatively wide frequency deviation of, say, ±5 mc. corresponding in width to the normal operating frequency range of deviation oscillator 13.

The output of deviation oscillator 13, therefore, will be frequency modulated over the entire 4275 to 4285-mc. band at the 60-cycle rate and, at the same time, will have superimposed thereon an additional component of frequency modulation that extends over a band approximately ±150 kc. in width at the 100-kc. rate as shown graphically at Fig. 2C. Otherwise stated, the frequency of deviation oscillator 13 is varied at a 100-kc. rate over a ±150-kc. band, and the frequency position of this band is shifted continually, back and forth across the entire 4275 to 4285-mc. operating frequency range at the relatively low rate of 60 cycles per second. The width of the ±150-kc. band corresponds to the frequency deviation of deviation oscillator 13 produced by the 100-kc. test signal component and is directly related to the slope of the modulation characteristic. Since the slope of the modulation characteristic is not constant, the frequency deviation produced by the 100-kilocycle test signal will be affected accordingly as the frequency position of the ±150-kc. band is swept over the operating range of deviation oscillator 13 by the 60-cycle sweep-signal component. It is these changes in the ±150-kilocycle frequency deviation of deviation oscillator 13 produced by the 100-kilocycle test signal that are used as a measure of the non-linearity of the frequency-deviation characteristic of deviation oscillator 13.

The mean frequency of beating oscillator 16 is centered at 4210 mc. and is varied by the output from A. F. C. circuit 18 which operates to maintain the I. F. difference signal resulting from heterodyning the outputs of deviation oscillator 13 and beating oscillation source 16 in the converter 15 constant at a frequency of 70 mc. The A. F. C. circuit is adjusted to follow with minimum delay the frequency deviation of deviation oscillator 13 produced by the 60-cycle sweep-signal component but not to follow the frequency deviation of deviation oscillator 13 due to the 100-kc. test signal component. The fast acting A. F. C. circuit thus removes the 60-cycle component of frequency modulation from the output of converter 15 by deriving therefrom a 60-cycle modulating voltage whose instantaneous value is proportional to the instantaneous frequency deviation of deviation oscillator 13 effected by the 60-cycle sweep-signal component. The derived 60-cycle modulating voltage is applied from the output of A. F. C. circuit 18 to the repeller electrode of beating oscillation source 16 and is of the correct magnitude and phase to cause the frequency-modulated output thereof to cancel the 60-cycle component of the frequency modulation of deviation oscillator 13 in converter 15. The 70-mc. I. F. signal at the output of the limiter amplifier 17 is, therefore, frequency modulated over a narrow frequency band, approximately ±150 kc., at the 100-kc. rate only, and the width of this band will vary in accordance with the slope and, hence, the non-linearity of the frequency-deviation characteristic as shown at Fig. 2D. Since the total frequency excursion applied to the discriminator 21 of the frequency-modulation receiver 19 is limited to the small deviation, ±150 kc., produced by the 100-kc. test signal, any variation in the slope of the discriminator characteristic, Fig. 2E, outside such deviation will not affect the measurement of the transmitter non-linearity.

The narrow band I. F. frequency-modulated wave is applied to the input of the receiver 19 where the wave is detected. The output of the receiver is illustrated at Fig. 2F and includes a 60-cycle and a 100-kc. component, the amplitude of the latter being modulated in accordance with the slope of the frequency-deviation characteristic shown in Fig. 2B. The narrow band-pass amplifier 23 accepts only the 100-kc. signal component of the receiver output and delivers the recovered 100-kc. test signal to the rectifier 25.

The rectified output of rectifier 25, which consists of the modulation envelope of the recovered 100-kc. test signal, is then applied through low-pass filter 27 to the vertically deflecting plates 40 of the cathode-ray oscilloscope 29 whose horizontally deflecting plates 41 are supplied with an internally provided 60-cycle sweep voltage from source 42 that may be synchronized with the 60-cycle power source 11.

The modulation envelope of the 100-kc. signal displayed on screen 43 of oscilloscope 29 consists of a sinuous trace $a$ which represents the limits of nonlinearity of the frequency deviation characteristic of the transmitter under test shown in Fig. 2B, and is a plot of departures from a frequency-deviation characteristic having a contant slope. Were the slope of the frequency-deviation characteristic constant over the operating range of the frequency-modulation transmitter under test, the oscilloscope trace would be a straight horizontal line. The per cent of non-linearity will correspond to the degree of modulation of the 100-kc. signal in the receiver output and can be determined by any of the usual methods for computing the degree of modulation.

To facilitate the above-described measurement of non-linearity, the equipment illustrated at Fig. 3 may be substituted in Fig. 1 to the left of line X—X, and is provided for the purpose of adding a parallel trace $b$ to the oscilloscope screen 43 as shown in Fig. 4. In Fig. 3, the output of the 100-kc. test signal source 10 is applied through two parallel paths to a two-position mercury contact relay 32, one path including an adjustable calibrated potentiometer 30 and contact 35 and the other path being a direct connection to contact 34. Normally, armature 33 rests on one contact 34, and when actuated is moved to contact 35. Relay 32 is energized by a conventional 30-cycle multivibrator 37 that is synchronized with 60-cycle source 11 as indicated by the broken line 45 in Fig. 3. Armature 33 is connected to the input of deviation oscillator 13.

On alternate cycles of the 60-cycle signal from source 11, the 100-kc. test signal from source 10 is changed in amplitude by an adjustable percentage $\Delta$ determined by the setting of the potentiometer 30. The oscilloscope presentation on screen 43 then becomes a pair of essentially parallel sinuous traces $a$, $b$ separated by the known amount $\Delta$ representing the difference in amplitude level of the 100-kc. test signal, as illustrated at Fig. 4. If the difference $\Delta$ between the parallel traces $a$, $b$ of Fig. 4 corresponds, for example, to a five per cent change in amplitude of the 100-kc. test signal, it follows therefrom that if the departure from linearity of the transmitter under test is under five per cent, it will be possible to draw a horizontal straight line $l$ between the two traces of the oscilloscope without intersecting either trace. The magnitude of the non-linearity for a given test of the type above-described is determined by reducing the change in amplitude of the 100-kc. test signal supplied by the signal source 10 to the one path via potentiometer 30 therein until such a line $l$ may no longer be drawn without intersecting either trace. The smallest potentiometer reading obtained for the change in 100-kc. test signal amplitude for which a horizontal line may be drawn, thus, directly measures the greatest departure from linearity of the frequency-deviation characteristic.

Although specific operating values are used in the description of the measuring scheme of Fig. 1, it is to be understood that the values are illustrative and that the measuring method is applicable in any frequency range with suitable changes of bandwidth and operating parameters.

What is claimed is:

1. The method of measuring the non-linearity of a frequency versus modulating voltage characteristic of a frequency-modulation signal transmitter over a normal operating frequency range thereof, which comprises frequency modulating the output voltage of said transmitter over a small portion of its normal operating frequency range at a first cyclical rate of repetition, simultaneously frequency modulating the output voltage of said transmiter over its normal operating frequency range at a second cyclical rate of repetition which is less than said first repetitive cyclical rate, mixing the frequency-modulated output voltages of said transmitter with a voltage having a frequency related to said second repetitive cyclical rate to produce a first component which is modulated in frequency over a range equivalent substantially to said frequency portion and repeated at said first cyclical rate and at the same time to produce a second component having frequency variations related to said second repetitive cyclical rate, utilizing said second component to control said mixing voltage in such manner as to cancel the frequency-modulated output voltages related to said second repetitive cyclical rate, deriving from said first component a third component corresponding to said first repetitive cyclical rate, and utilizing said third component to provide an indication representing a measurement of the non-linearity of said characteristic of said transmitter.

2. Apparatus for measuring the non-linearity of a frequency versus modulating voltage characteristic of a signal transmitter adapted for frequency modulation over a normal operating range, comprising a first source of voltage for frequency modulating the output voltage of said transmitter over a portion of said normal operating range at a first cyclical rate of repetition, a second source of voltage for simultaneously frequency modulating the output voltage of said transmitter over said normal operating range at a second cyclical rate of repetition which is lower than said first repetitive cyclical rate, a source of beating oscillations adapted to be modulated in frequency over a range equivalent to said normal operating frequency range repeated at said second cyclical rate but having a mean frequency differing from the mean frequency of said normal operating frequency range by a preselected amount, means for converting the output voltages of said transmitter and oscillation source into a first predetermined component having a frequency equal to said preselected frequency difference and modulated in frequency over a range equivalent substantially to said portion of said normal operating frequency range repeated at said first cyclical rate, said means also converting said output voltages into a second predetermined component equivalent in frequency to said normal operating frequency range repeated at said second cyclical rate, an automatic frequency control connected to the output of said converting means and the input of said oscillation source, said control being responsive at the frequency of said second predetermined component to modulate the frequency of the output voltage of said oscillation source so that said first predetermined component is provided with said preselected frequency difference over said normal operating range, frequency-detection means for deriving from said first predetermined component a third component corresponding to said first repetitive cyclical rate, a supply of voltage having a frequency equivalent to said second repetitive cyclical rate effected by said second source and synchronized therewith, and means for utilizing said supply voltage and said third component to provide an indication representing a measurement of the non-linearity of said characteristic of said transmitter.

3. The apparatus according to claim 2 in which said indicating means comprises a cathode-ray oscilloscope having a pair of vertically deflecting plates, a pair of horizontally deflecting plates and a screen, said frequency-detection means is connected to said vertically deflecting plates for applying said third component thereto, said voltage supply is connected to said horizontally deflecting plates, and said screen displays a trace which corresponds to said third component and thereby indicates said measurement of the non-linearity of said characteristic of said transmitter.

4. The apparatus according to claim 2 for comparing said frequency versus modulating voltage characteristic of said signal transmitter as a normal characteristic with a similar characteristic reduced by a predetermined magnitude, which includes means for simultaneously applying said first modulating voltage to each of two parallel paths, a calibrated attenuator in one of said paths, switching means synchronized with the voltage of said second modulating source for directly connecting said first modulating source to said transmitter via the other of said paths on alternate cycles of said second modulating voltage and for connecting said first modulating source to said transmitter via said one path and said attenuator therein on the next succeeding alternate cycles of said last-mentioned voltage, said attenuator being initially adjusted to attenuate said first modulating voltage in said one path by a predetermined magnitude whereby the portions of said first modulating voltage applied to said transmitter via said two paths is caused to have a predetermined magnitude difference therebetween, said converting means converts the output voltages of said transmiter and oscillation source into two of said first predetermined components having substantially said predetermined magnitude difference therebetween, each of said last-mentioned two first predetermined components having a frequency equal to said preselected frequency difference and being modulated in frequency over a range equivalent substantially to said portion of said normal operating frequency range repeated at said first cyclical rate, said automatic frequency control operates to provide said last-mentioned two first predetermined components with the preselected frequency difference over said normal operating range, said frequency-detection means derives from said two first predetermined components two of said third components having said predetermined magnitude difference therebetween and corresponding to said first repetitive cyclical rate, and said indicating means utilizes said two third components to produce two indications having the predetermined magnitude difference therebetween as comparison measurements of the non-linearity of said normal characteristic of said transmitter and a similar characteristic reduced by the predetermined magnitude.

5. The method of measuring the non-linearity of a frequency versus modulating voltage characteristic of a frequency-modulation device, which comprises simultaneously modulating the output voltage of said device over two different frequency ranges at two different cyclic rates of repetition in such manner that the smaller frequency range is changed at the higher repetitive cyclical rate as the smaller frequency range is swept back and forth across the larger frequency range at the lower repetitive cyclical rate, translating the frequency modulated output voltages into a first component modulated in frequency at the lower repetitive cyclical rate and also into a second component modulated in frequency over the smaller range at the higher repetitive cyclical rate, utilizing said first component to control said translation so as to cancel the frequency-modulated output voltages related to the lower repetitive cyclical rate, detecting said second component to produce a third component corresponding to the higher repetitive cyclical rate, and utilizing said last-mentioned component to provide a measurement of said characteristic of said device.

6. The method of comparing the non-linearity of a frequency versus modulating voltage characteristic of a frequency modulation device at two different magnitudes, which comprises modulating the frequency of the output voltage of said device over a normal operating range at a certain cyclical rate of repetition, at the same time intermittently modulating the output voltage of said device over a section of said normal operating frequency range at a cyclical rate of repetition higher than said certain repetitive cyclical rate in such manner that successive discrete portions of said last-mentioned frequency modulated voltage have the two different magnitudes, translating the frequency modulated output voltages of said device into two discrete voltage components modulated in frequency at the higher repetitive cyclical rate while at the same time removing from the last-mentioned output voltages the frequency modulation corresponding to said certain repetitive cyclical rate, said two components having the two different magnitudes, detecting said two components to produce two other components having two different magnitudes and corresponding to the higher repetitive cyclical rate, and utilizing said two other components to provide two simultaneous measurements representing the comparison of non-linearity of said characteristic of said device at the two different magnitudes.

7. A system for measuring the non-linearity of a frequency versus modulating voltage characteristic of a frequency modulation device, comprising means for simultaneously applying two voltages of different frequencies and different magnitudes to said device to modulate simultaneously the frequency of the output voltages thereof over two discrete ranges at two different cyclical rates of repetition whereby the smaller frequency range is repeated at the higher cyclical rate while the larger frequency range is repeated at the lower cyclic rate but the smaller frequency range is swept back and forth across the larger frequency range, means including an automatic frequency control for translating the frequency-modulated output voltages of said device into a wave modulated in frequency over the smaller frequency range at the higher repetitive cyclical rate, said automatic frequency control being responsive to the frequency modulation produced by the modulating voltage of the larger frequency range repeated at the lower cyclical rate to remove the last-mentioned frequency modulation from the frequency-modulated output voltages of said device, frequency-detection means for so detecting said component as to produce another component corresponding to the higher repetitive cyclical rate, and means for utilizing said last-mentioned component to provide a measurement of said characteristic of said device.

8. A system for measuring the non-linearity of a frequency versus modulating voltage characteristic of a frequency-modulation device, comprising means for simultaneously applying two voltages of different frequencies to said device to modulate simultaneously the frequency of the output voltages thereof over two discrete ranges at two different cyclical rates of repetition whereby the smaller frequency range is repeated at the higher cyclical rate while the larger frequency range is repeated at the lower cyclic rate but the smaller frequency range comprises a portion of the larger frequency range, means including an automatic frequency control for translating the frequency-modulated output voltages of said device into a component modulated in frequency over the smaller frequency range at the higher repetitive cyclical rate, said automatic frequency control being responsive to the frequency-modulation component corresponding to the lower repetitive cyclical rate to remove the last-mentioned component from the frequency-modulated output voltages of said device, frequency-detection means for so detecting said component as to produce another component corresponding to the higher repetitive cyclical rate, and means for utilizing said last-mentioned component to provide an indication of a measurement of said characteristic of said device, said indication means comprising a cathode-ray oscilloscope including a pair of certically deflecting plates, a pair of horizontally deflecting plates, a screen, and a supply of voltage having a frequency equivalent to the lower repetitive cyclical rate of said modulating means and being synchronized therewith, said detecting means having its output connected to said vertically deflecting plate for applying said other component thereto, said voltage supply being connected to said horizontally deflecting plates, and said screen displaying a trace which provides said indication of said measurement of said characteristic of said device.

9. A system for measuring the non-linearity of a frequency versus modulating voltage characteristic of a frequency-modulation device, comprising means for applying a voltage of certain frequency to said device to modulate the frequency of the output voltage thereof over a normal operating range repeated at the rate of said certain frequency, means for producing a voltage whose frequency is higher than said certain frequency, means for applying said last-mentioned voltage to said device in discrete spurts of successively different magnitudes to modulate the frequency of the output voltage thereof in discrete portions, said modulating voltages being simultaneously applied to said device, said last-mentioned output voltage of said device being modulated in such manner that said portions have a frequency range which is less than but comprises a section of said normal operating frequency range and which is repeated at the rate of the higher frequency, said frequency-modulated output voltage of discrete portions being also modulated in such manner that the successive discrete portions have different magnitudes, means including an automatic frequency control for translating said frequency-modulated output voltages of said device into two voltage components in such manner that the successive components have different magnitudes, each of said last-mentioned two components being modulated in frequency over a range equivalent to said section of said normal operating frequency range repeated at the rate of the higher frequency, said automatic frequency control being responsive to the frequency modulation produced by the voltage of said first-mentioned modulating means to remove the last-mentioned frequency modulation from said frequency-modulated output voltages of said device, frequency-detection means for so detecting said last-mentioned two components as to provide two other components in such manner that successive other components have different magnitudes and correspond to the repetitive rate of the higher frequency, and means for utilizing said two other components to provide two simultaneous indications representing measurements of the non-linearity of said characteristic of said device at the two different magnitudes.

10. Apparatus for measuring the non-linearity of a frequency versus modulating voltage characteristic of a frequency-modulation device, comprising means for applying a first modulating voltage to said device to modulate the frequency of the output voltage thereof over a certain range at a first cyclical rate of repetition, means for applying a second modulating voltage to said device to modulate the frequency of the output voltage thereof over a further range at a second cyclical rate of repetition which is less than said first repetitive cyclical rate, said further frequency range having a predetermined mean frequency and being wider than but including said certain frequency range, said modulating voltages being simultaneously applied to said device to superimpose said first-mentioned frequency modulated voltage upon said second-mentioned frequency modulated voltage whereby said certain frequency range repeated at said first cyclical rate is swept across said further frequency range, a source of beating voltage modulated in frequency over a range equivalent to said further frequency range repeated at said second cyclical rate but having a mean frequency differing by a preselected amount from the predetermined mean frequency of said further frequency range, means for translating said frequency-modulated voltages of said device and source into a first voltage component modulated in frequency over a range equivalent to said further frequency range repeated at said second cyclical rate and into a second voltage component having a frequency equivalent to said preselected frequency difference and modulated in frequency over a range equivalent to said certain range repeated at said first cyclical rate, an automatic frequency control for maintaining said second component at said preselected frequency over said further frequency range, said control being responsive to said first voltage component to derive therefrom a voltage whose frequency varies at said second cyclical rate and to apply said last-mentioned voltage to said source to so modulate the frequency of the output voltage thereof as to provide said second component with said preselected frequency over said further frequency range repeated at said second cyclical rate, modulation-receiving means for so detecting said second component as to produce a third voltage component corresponding to said first repetitive cyclical rate, and means for utilizing said third component to provide an indication thereof as a measurement of the non-linearity of said characteristic of said device, said last-mentioned means comprising a cathode-ray oscilloscope, including a pair of vertically deflecting plates connected to the output of said detecting means, a pair of horizontally deflecting plates connected to a voltage supply means which has a frequency equal to the repetitive cyclical rate of said second modulating voltage and which is synchronized therewith, and a screen for displaying a trace representing said indication.

11. Apparatus according to claim 10 for measuring the non-linearity of the frequency versus modulating voltage characteristic of said device, including switching means for applying said first modulating voltage to said device via each of two alternate paths, and a calibrated potentiometer in one of said paths for reducing the amplitude of said first modulating voltage in said one path by a predetermined magnitude, said switching means being synchronized with the modulating voltage of said second modulating means so that the respective paths are connected to said device on alternate cycles of said second cyclical rate of said second modulating voltage whereby said source, said translating means, said automatic frequency control and said detecting means are caused to produce two of said third components corresponding to said first repetitive cyclical rate and having the predetermined magnitude difference therebetween, and said two third components are applied to said vertically deflecting plates from the output of said detecting means, said oscilloscope screen displays two displaced traces of said characteristic.

12. A system for indicating the modulation characteristic of a frequency-modulation transmitter comprising means to apply to said transmitter simultaneously two modulating waves differing in frequency, the first wave having an amplitude sufficient to produce frequency modulation in said transmitter over only a small fraction of its total modulation range, the second wave having a frequency that is low in comparison with the first wave and an amplitude sufficient to sweep the output frequency of the transmitter over its total range in repetitive cycles, whereby the degree of modulation produced by the first wave is in accordance with different portions of the characteristic in successive times along a sweep cycle of the second wave, means to eliminate the modulation produced by said second wave comprising means to heterodyne the output waves from said transmitter against a beating oscillator having a frequency varying at the frequency of said second wave whereby the heterodyned wave contains only frequency variations due to modulation by said first wave, means to translate said frequency variations into corresponding variations in voltage with time, and means to indicate said voltage variations in time throughout a cycle of the low frequency second wave.

13. The method of measuring the modulation characteristics of a frequency-modulation transmitter, which comprises simultaneously modulating the output voltages of said transmitter over two different frequency ranges at two different cyclical rates of repetition in such manner that the smaller frequency range repeated at the higher cyclical rate is swept back and forth across the larger frequency range repeated at the lower cyclical rate and in such manner that the larger frequency range is provided with a predetermined mean frequency, producing a beating voltage modulated in frequency over a range equivalent to the larger frequency range repeated at the lower cyclical rate but having a mean frequency differing by a preselected amount from the predetermined mean frequency of the larger frequency range, heterodyning said output voltages and said beating voltage to produce a first component modulated in frequency over the larger frequency range repeated at the lower cyclical rate and a second component equivalent in frequency to said preselected frequency difference and modulated in frequency over the smaller frequency range repeated at the higher cyclical rate, utilizing said first component to control the production of said beating voltage for maintaining said second component at said preselected frequency difference over the larger frequency range, deriving from said second component a third component corresponding to the higher repetitive cyclical rate, and utilizing said third component to provide an indication representing a measurement of the non-linearity of the modulation characteristic of said transmitter.

References Cited in the file of this patent

UNITED STATES PATENTS

| Number | Name | Date |
|---|---|---|
| Re. 22,150 | Bagno et al. | Aug. 4, 1942 |
| 2,189,457 | Archer | Feb. 6, 1940 |
| 2,215,197 | Sherman | Sept. 17, 1940 |
| 2,233,183 | Roder | Feb. 25, 1941 |
| 2,378,298 | Hilferty | June 12, 1945 |
| 2,495,997 | Ames | Jan. 31, 1950 |